United States Patent [19]

Kazerooni

[11] Patent Number: 4,884,941
[45] Date of Patent: Dec. 5, 1989

[54] ACTIVE COMPLIANT END-EFFECTOR WITH FORCE, ANGULAR POSITION, AND ANGULAR VELOCITY SENSING

[75] Inventor: Homayoon Kazerooni, Minneapolis, Minn.

[73] Assignee: Regents of the University of Minnesota, Minneapolis, Minn.

[21] Appl. No.: 31,769

[22] Filed: Mar. 30, 1987

[51] Int. Cl.$^4$ .............................................. B66C 1/10
[52] U.S. Cl. ................... 414/744.5; 414/917; 901/9; 901/41; 901/45; 51/165.71; 74/479
[58] Field of Search ............ 51/165.71, 165, 74, 51/166 TS; 901/9–10, 27–29, 30, 32, 34, 41, 45; 414/917, 744 A, 744 R; 74/479; 318/568, 568 D

[56] References Cited

U.S. PATENT DOCUMENTS

| | | | |
|---|---|---|---|
| 4,098,001 | 7/1978 | Watson | 33/169 C |
| 4,155,169 | 5/1979 | Drake et al. | 33/169 C |
| 4,324,032 | 4/1982 | Gustavson et al. | 901/45 X |
| 4,341,502 | 7/1982 | Makino | 901/15 X |
| 4,491,760 | 1/1985 | Linvill | 73/862.04 |
| 4,523,409 | 6/1985 | De Fazio | 901/44 X |
| 4,603,511 | 8/1986 | Komatsu et al. | 51/165.71 |
| 4,621,332 | 11/1986 | Sugimoto et al. | 901/9 X |
| 4,633,414 | 12/1986 | Yabe et al. | 364/513 |
| 4,637,775 | 1/1987 | Kato | 414/744 R |
| 4,668,146 | 5/1987 | Ageta | 901/49 X |
| 4,706,004 | 11/1987 | Komatsu et al. | 318/568 |
| 4,712,971 | 12/1987 | Fyler | 414/744 R |
| 4,756,662 | 7/1988 | Tanie et al. | 414/729 |

FOREIGN PATENT DOCUMENTS

| | | | |
|---|---|---|---|
| 2460762 | 3/1981 | France | 414/917 |
| 31456 | 3/1977 | Japan | 74/479 |
| 918081 | 4/1982 | U.S.S.R. | 901/9 |

OTHER PUBLICATIONS

D. Seltzer, "Compliant Robot Wrist Sensing for Precision Assembly", ASME Winter Proceedings, 12/86, pp. 161–168.
H. Kazerooni et al., "The Fundamental Concepts of Robust Compliant Motion for Robot Manipulators", IEEE J. Robotics & Auto., 6/86.
H. Asada et al., "M.I.T. Direct-Drive Arm Project", ASME J. Dynamic Syst., Meas., Constr., vol. 106, No. 3, 1984.
"An Approach to Automated Deburring by Robot Manipulators", authored by H. Kazerooni, J. J. Bausch and B. M. Kramer, dated Dec. 1986, pp. 354–359, Transactions of the ASME, reprinted from Dec. 1986, vol. 108, Journal of Dynamic Systems, Measurement, and Control.

Primary Examiner—Robert J. Spar
Assistant Examiner—William M. Hienz
Attorney, Agent, or Firm—Merchant, Gould, Smith, Edell, Welter & Schmidt

[57] ABSTRACT

A direct-drive active compliant end-effector (10) comprises a planar linkage (28) having input links (30, 44) driven by motors (24, 26). A force sensor (52) is connected between the output link (36) and a tool mount (48) for measuring tool interaction forces, signals representative of which together with those representative of angular displacement and velocity of the input links (30, 44) are used by a controller (82) for controlling the drive motors (24, 26) to provide active electronic compliancy.

15 Claims, 2 Drawing Sheets

ACTIVE COMPLIANT END-EFFECTOR WITH FORCE, ANGULAR POSITION, AND ANGULAR VELOCITY SENSING

TECHNICAL FIELD

The present invention relates generally to robotics, and more particularly to an active compliant end-effector which behaves dynamically as a two-dimensional remote center compliance (RCC) device but whose compliance is developed and controlled electronically through impedance control via direct-drive motors.

BACKGROUND ART

Manufacturing manipulations require mechanical interaction with the environment or with the object being manipulated. Robotic manipulators are subject to interaction forces when they maneuver in a constrained workspace. Assembly of parts and deburring edges of workpieces are examples of constrained maneuvers wherein one is concerned not only with the position of the robot end point, but also the contact forces upon engagement with the workpiece. In constrained maneuvering, the interaction forces must be accommodated rather than resisted. If we define "compliancy" as a measure of the ability of such manipulators to react to interaction forces and torques, the objective is to assure compliant motion (passively or actively) toward the robot end point in the Cartesian coordinate system for manipulators that must maneuver in a constrained environment.

Robotic assembly is an example of a manufacturing manipulation that requires compliancy. The reason is that the parts typically are not perfectly aligned. To perform assembly of slightly misaligned parts, a compliant element is typically placed between the part and the robot to ease the insertion process. The remote center compliance (RCC) device can be attached to the end point of robot manipulators. This device provides a passive compliant interface between the robot and the part, and functions primarily as a filter to decrease the contact force between the part and the robot due to programming errors, vibration or isolation of the robot, and part fixturing errors. Such devices are considered passive because the elements that generate compliance are simply passive springs whose resistance is a function of their displacement. U.S. Pat. Nos. 4,537,557, 4,414,750 and 4,283,153 are representative of the prior art in this regard.

Although the RCC devices of the prior art have functioned reasonably well, they have limited controllability because their compliancy cannot be adjusted without at least some disassembly to change their springs. This of course involves interruption of the assembly operation.

Active end effectors have also been available heretofore. Hollis proposed such a device in an article entitled "A Planar XY Robotic Fine Positioning Device", IEEE Proceedings, July, 1985. That device incorporates electromagnetic positioning and computer control to obtain precise positioning, however, no provision is made for active compliance control.

A need has thus arisen for an active compliant end-effector whose compliancy is generated electronically so that it can be modulated in response to the task for more accuracy.

SUMMARY OF THE INVENTION

The present invention comprises an active compliant end-effector which overcomes the foregoing and other difficulties associated with the prior art. In accordance with the invention, there is provided an end-effector adapted for mounting between a tool and the end of a robotic manipulator. The end-effector herein comprises a linkage with two degrees of freedom driven by separate rotary actuators. The actuators are preferably direct-drive motors equipped with resolvers for generating signals representative of angular displacement and velocity. A force sensor is provided between the tool and the linkage for measuring the force in orthogonal directions in the plane of the linkage. These signals are utilized by a controller to control the actuators.

BRIEF DESCRIPTION OF THE DRAWINGS

A better understanding of the invention can be had by reference to the following Detailed Description in conjunction with the accompanying Drawings, wherein.

DETAILED DESCRIPTION

Figure 1:
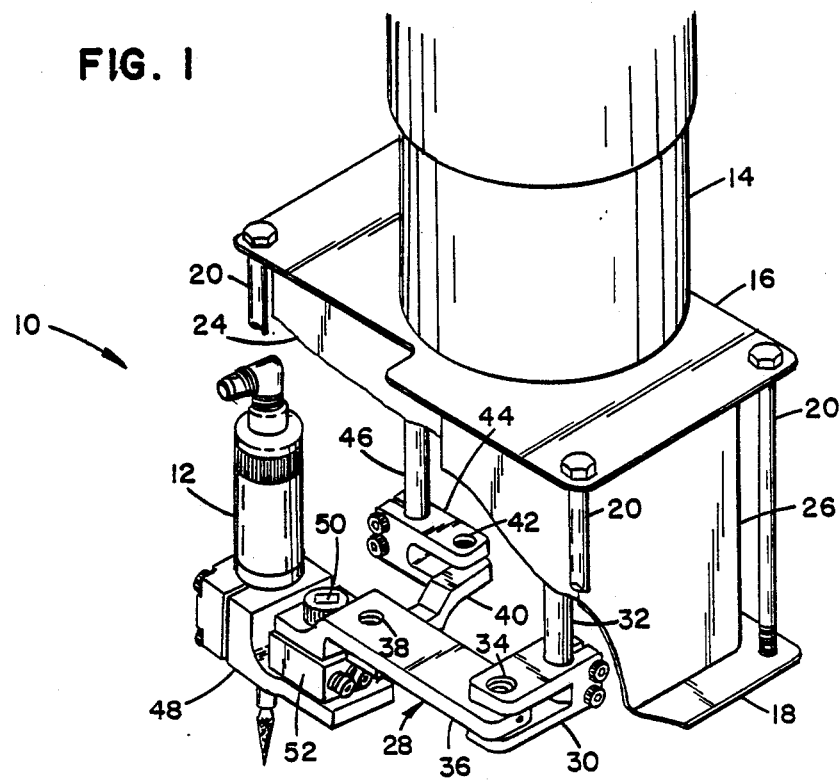
FIG. 1 is a perspective view of the active compliant end-effector of the present invention mounted on the end of a robotic manipulator.

Referring now to the Drawings, wherein like reference numerals designate like or corresponding parts throughout the views, and particularly referring to FIG. 1, there is shown the active compliant end-effector 10 of the invention mounted between a tool 12 and a robotic manipulator 14. As shown, the tool 12 comprises a pneumatic grinder like that used in deburring the edge of a workpiece, although any suitable tool can be used. The tool 12 can comprise a gripper, drill, welding head or any other tool wherein compliancy is desired. Similarly, any suitable robotic manipulator can be used, the particular type not being critical to practice of the invention. As will be explained more fully hereinafter, the end-effector 10 incorporates direct-drive motors and a force sensor to achieve active compliancy and thus more controllability and accuracy in the task being performed by the robotic manipulator 14 with tool 12.

Figure 2:
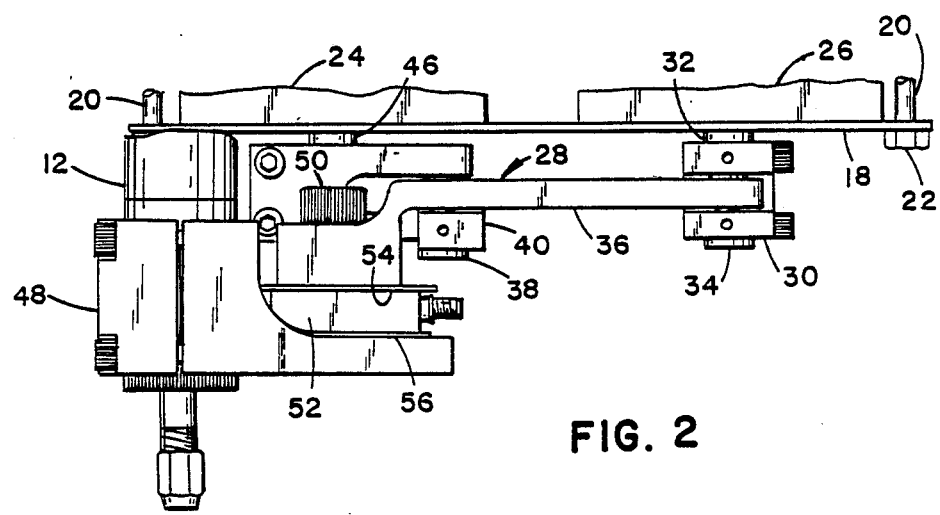
FIG. 2 is a side view of the end-effector.
Figure 3:
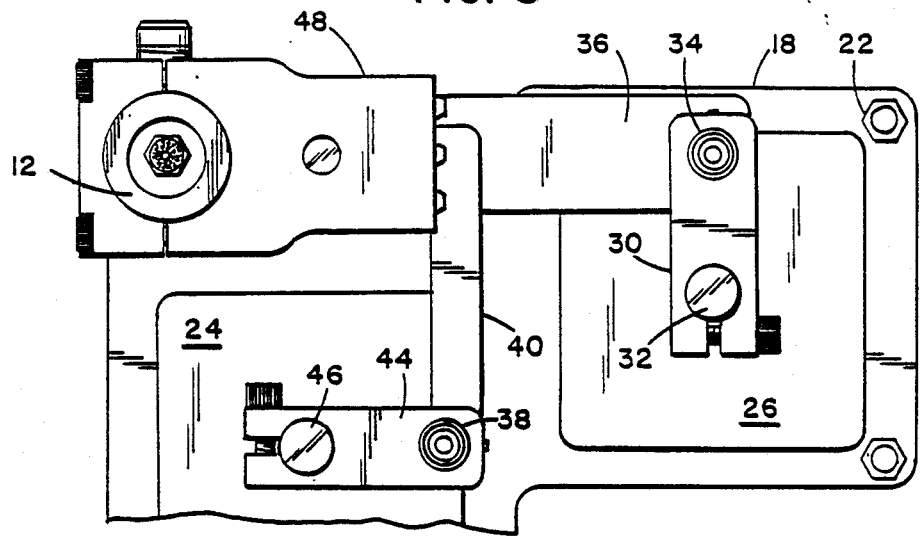
FIG. 3 is a bottom view of the end-effector.

The constructional details of the end-effector 10 are shown in FIGS. 1–3. The end-effector 10 includes a pair of spaced apart mounting plates 16 and 18 interconnected at their corners by bolts 20 and nuts 22. The upper plate 16 is secured to the end of the robotic manipulator 14. A pair of rotary actuators or motors 24 and 26 are positioned between plates 16 and 18, and are secured to the lower plate 18. The motors 24 and 26 are preferably conventional brushless DC motors equipped with resolvers for generating signals representative of their angular displacement (G) and velocity (W). For example model 3001 brushless DC motors from Moog, Inc. of Buffalo, New York, can be used. The motors 24 and 26 are preferably drivingly engaged directly with a linkage 28 to avoid backlash and provide more rigidity for wider bandwidth control, and more accuracy and precision in the system.

The linkage 28 comprises a planar, five bar linkage. A first drive link 30 is secured at one end to the drive shaft 32 of motor 26. The other end of link 30 is connected at pivot 34 to one end of an output link 36, the other end of which is connected at pivot 38 to one end of a connecting link 40. The other end of link 40 is connected at pivot 42 to a second drive link 44, which is secured at its other end to the drive shaft 46 of the other motor 24. The fifth link, of course, comprises plate 18 securing motors 24 and 26 and their respective drive shafts 46 and 32 in fixed relative position. The rotational axes of pivots 34, 38 and 42 are parallel.

The tool 12 is secured within a mount 48 connected to the output link 36 by bolt 50. A force sensor 52 is connected between the mount 48 and the output link 36. The force sensor 52 preferably comprises a conventional piezoelectric device for measuring orthogonal force components in its plane, which is parallel to the plane of linkage 28. For example, a Model 9251A force transducer manufactured by Kistler Instrument Corporation of Clarence, New York, can be utilized for sensor 52. Insulators 54 and 56 are preferably provided between sensor 52, mount 48 and output link 36 to isolate the sensor 52 from spurious signals.

The use of a two dimensional force sensor 52 in combination with direct-drive motors 24 and 26 and linkage 28 comprise significant features of the present invention.

Figure 4:
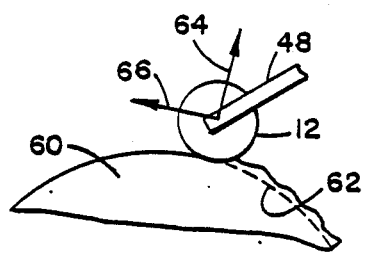
FIG. 4 is an illustration of an edge being deburred.

FIG. 4 illustrates application of the active compliant end-effector 10 to deburring the edge of a workpiece 60. The objective is to smooth the edge of the workpiece 60 down to the desired trajectory depicted by dashed line 62. It is intuitive to design a system with a large impedance (small compliance) in the normal direction 64 and a small impedance (large compliance) in the tangential direction 66. We define impedance as the ratio of the contact force to the end-effector deflection as a function of frequency. A large impedance or stiffness in the normal direction 64 causes the end point of the grinding tool 12 to reject the interaction forces and stay very close to the desired trajectory 62. The higher the impedance or stiffness of the end-effector 10 in the normal direction 64, the smoother the edge of the workpiece 60. Given the volume of material to be removed, the desired tolerance in the normal direction 64 prescribes an approximate value for the impedance or stiffness in the normal direction 64. The force necessary to cut in the tangential direction 66 at a constant speed is approximately proportional to the volume of material to be removed. Of course, as the grinding tool 12 moves along the edge of the workpiece 60, it encounters burrs of different sizes. The larger the burr, the slower the robotic manipulator 14 must move in the tangential direction 66 to maintain a relatively constant tangential force. This is necessary because the slower speed of the end point along the surface implies a smaller volume of material to be removed per unit of time, and consequently, less force in the tangential direction 66. Therefore, the travel speed of the grinding tool 12 should slow in response to contact with large burrs.

This means that it is necessary for end-effector 10 to accomodate the interaction forces along the tangential direction 66 which in turn implies a small impedance or stiffness in that direction. Otherwise, the large burrs on the workpiece 60 will produce large contact forces in the tangential direction 66 which will stall the grinding tool 12, and cause deflection which might exceed the desired tolerance. Accordingly, a small value for the impedance or stiffness in the tangential direction 66 relative to that in the normal direction 64 assures small contact force in the tangential direction. The frequency spectrum of the workpiece roughness and the desired travel speed of the grinding tool 12 therealong determine the frequency range of operation.

On the other hand, to compensate for vibration or oscillation of the robotic manipulator 14, the impedance or stiffness of the end-effector 10 in the normal direction 64 should be small for all frequency ranges of the oscillations and fixturing errors. However, selecting a large impedance in the normal direction 64 for deburring purposes conflicts with the required impedance or stiffness to compensate for oscillations of the robotic manipulator 14, which calls for a low impedance (large compliance) in the normal direction 64.

Figure 5:
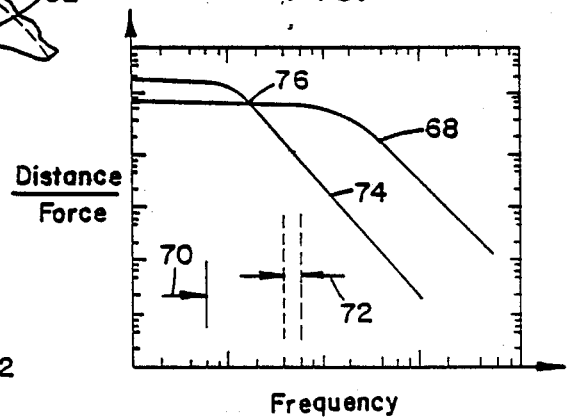
FIG. 5 is a graph of the dynamic behavior of the end-effector herein.

FIG. 5 represents the dynamic response of the end-effector 10. The tangential force represented by curve 68 is large over the frequency range 70 of oscillation of the robotic manipulator 14, and very small over the frequency range 72 of the burrs on the edge of workpiece 60. Line 74 represents the normal force curve. Because these curves have an adjustable crossover point 76, the relative stiffness in the tangential and normal directions can be controlled as desired. A passive end-effector using RCC cannot approach these dynamic characteristics because of the effect of the mass of the grinding tool 12 on the dynamic behaviour of the end-effector.

Figure 6:
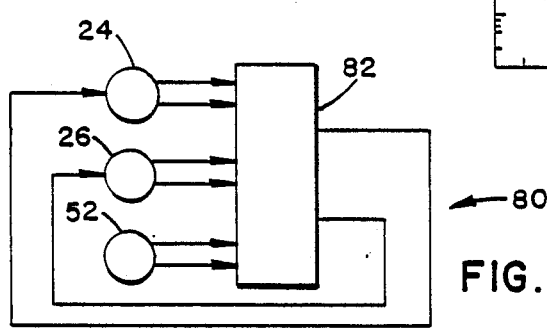
FIG. 6 is a schematic diagrm of a control system including the active compliant end-effector herein.

FIG. 6 is a schematic diagram of a system 80 incorporating a controller 82 which receives the normal and tangential force signals from sensor 52, as well as the angular displacement and velocity signals from motors 24 and 26. The controller then manipulates this information to generate control signals to motors 24 and 26 in order to achieve the desired stiffness or impedance. Controller 82 can comprise a microprocessor.

From the foregoing, it will thus be apparent that the present invention comprises a direct-drive active compliant end-effector having numerous advantages over the prior art. Unlike passive devices, no springs or dampers are used herein. Compliancy is developed electronically and can thus be modulated by an on-line computer. The end-effector herein allows for compensation of the positional deviations of the robotic manipulator and the fixture holding the workpiece, programming resolution, and vibration or oscillations of the robotic manipulator. Uncoupled dynamic behaviour over a bounded range can be achieved. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. An end-effector for use with a robotic manipulator, comprising:
   a linkage including an output link, a first drive link and a connecting link each coupled at one end in a spaced-apart relationship to the output link, and a second drive link coupled at one end to the other end of the connecting link;
   means for mounting a tool on the output link of said linkage;

first rotary drive means coupled to the other end of the first drive link of said linkage for applying torque thereto and for generating signals representative of its angular displacement and angular velocity;

second rotary drive means coupled to the other end of the second drive link of said linkage for applying torque thereto and for generating signals representative of its angular displacement and angular velocity; and sensor means connected between said tool mounting means and the output link of said linkage for generating signals representative of forces in orthogonal directions parallel to the plane of the output link of said linkage upon interaction of the tool with a workpiece;

said first and second rotary drive means each being responsive to said angular displacement, angular velocity and force signals for applying controlled torque to said linkage in order to achieve active electronic compliancy between the tool and manipulator upon interaction with the workpiece.

2. The end-effector of claim 1, wherein said first rotary drive means comprises a brushless, DC motor with a resolver.

3. The end-effector of claim 1, wherein said second rotary drive means comprises a brushless, DC motor with a resolver.

4. The end-effector of claim 1, wherein said sensor means for generating signals representative of orthogonal forces parallel to the plane of the output link of said linkage comprises a piezoelectric force transducer.

5. An end-effector for use with a robotic manipulator and with a controller for electronically controlling compliancy between the manipulator and a tool interacting with a workpiece, comprising:

a linkage including a first drive link, an output link coupled at one end to the first drive link, a connecting link coupled at one end to the other end of said output link, and a second drive link coupled to the other end of said connecting link;

the tool being mounted on the output link of said linkage;

a first motor including a shaft drivingly connected directly to the first drive link of said linkage, said first motor including a resolver for generating signals representative of angular displacement and angular velocity of the first drive link;

a second motor including a shaft drivingly connected directly to the second drive link of said linkage, said second motor including a resolver for generating signals representative of the angular displacement and angular velocity of the second drive link;

means for supporting said first and second motors on the robotic manipulator with their shafts in fixed relative spaced-apart positions; and sensor means connected between the tool and the output link of said linkage for sensing forces, in two directions in a plane parallel to the plane of the output link of said linkage upon interaction of the tool with the workpiece, and generating signals representative thereof; and the controller being responsive to the angular displacement and angular velocity signals of said first and second motors and the force signals from said sensor means to control torque applied by said motors in order to achieve active electronic compliance.

6. The end-effector of claim 5, wherein said first motor comprises a brushless DC motor.

7. The end-effector of claim 5, wherein said second motor comprises a brushless DC motor.

8. The end-effector of claim 5, wherein the directions of the forces sensed by said sensor means parallel to the plane of the output link of said linkage are mutually orthogonal.

9. The end-effector of claim 5, wherein said sensor means comprises a two-dimensional piezoelectric force transducer.

10. The end-effector of claim 5, further including:
means for insulating said sensor means from spurious signals.

11. An end-effector system for connection between a robotic manipulator and a tool, comprising:

a linkage including a first drive link, an output link coupled at one end to the first drive link, a connecting link coupled at one end to the other end of said output link, and a second drive link coupled to the other end of said connecting link;

the first drive link and connecting link extending transverse to the output link, and the second drive link extending transverse to the connecting link, with the tool being mounted on the output link of said linkage;

a first motor drivingly connected to the first drive link of said linkage, said first motor including a resolver for generating signals representative of angular displacement and angular velocity of the first drive link;

a second motor drivingly connected to the second drive link of said linkage, said second motor including a resolver for generating signals representative of the angular displacement and angular velocity of the second drive link;

sensor means connected between the tool and the output link of said linkage for sensing forces, in two directions in a plane parallel to the plane of the output link of said linkage upon interaction of the tool with a workpiece, and generating signals representative thereof; and means for individually controlling said first and second motors responsive to their angular displacement and angular velocity signals and the force signals from said sensor means in order to achieve active electronic compliance between the manipulator and tool during interaction with the workpiece.

12. The end-effector system of claim 11, wherein said first motor comprises a brushless, DC motor with a resolver.

13. The end-effector system of claim 11, wherein said first and second motors each comprises a brushless, DC motor with a resolver.

14. The end-effector system according to claim 13, wherein the directions of the forces sensed by said sensor means are mutually orthogonal.

15. The end-effector system according to claim 14, wherein said sensor means comprises a piezoelectric force transducer.

* * * * *